(12) United States Patent
Ko et al.

(10) Patent No.: US 9,252,884 B2
(45) Date of Patent: *Feb. 2, 2016

(54) APPARATUS, METHOD, AND SYSTEM FOR IMPROVING BANDWIDTH OF A PLUG AND A CORRESPONDING RECEPTACLE

(71) Applicant: Intel Corporation, Santa Clara, CA (US)

(72) Inventors: Jamyuen Ko, San Jose, CA (US); Hengju Cheng, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,244

(22) Filed: Oct. 21, 2013

(65) Prior Publication Data

US 2014/0050491 A1 Feb. 20, 2014

Related U.S. Application Data

(63) Continuation of application No. 12/890,443, filed on Sep. 24, 2010, now Pat. No. 8,571,413.

(51) Int. Cl.
*H04B 10/00* (2013.01)
*H04B 10/40* (2013.01)
*G02B 6/32* (2006.01)
*G02B 6/38* (2006.01)

(52) U.S. Cl.
CPC *H04B 10/40* (2013.01); *G02B 6/32* (2013.01); *G02B 6/3817* (2013.01); *G02B 6/3893* (2013.01)

(58) Field of Classification Search
CPC .......................................... H04B 10/40
USPC .................................. 398/135–139
See application file for complete search history.

(56) References Cited

U.S. PATENT DOCUMENTS

| 6,491,442 B1 | 12/2002 | Murakami |
| 2010/0080519 A1 | 4/2010 | Ko et al. |
| 2010/0158449 A1 | 6/2010 | Yi |

(Continued)

FOREIGN PATENT DOCUMENTS

| CN | 101825747 A | 9/2010 |
| CN | 101840034 A | 9/2010 |

(Continued)

OTHER PUBLICATIONS

Notification of Reasons for Refusal issued for Japanese Patent Application No. 2013-528404, mailed Nov. 26, 2013, 6 pages.

(Continued)

*Primary Examiner* — Daniel Dobson
(74) *Attorney, Agent, or Firm* — Blakely, Sokoloff, Taylor & Zafman LLP (57) ABSTRACT

Described herein is an apparatus for improving bandwidth of a transceiver system e.g., a Universal Serial Bus (USB) micro-B connector. The apparatus comprises a first pair of lens units, each lens unit of the pair positioned on either side of an input-output (I/O) bus interface, the pair of lens units to send and receive optical signals respectively; a first housing to shield the first pair of lens units and for physically coupling the I/O bus interface and the first pair of lens units to a receptacle; and a key to grasp the first housing and to lock the first housing with the receptacle.

20 Claims, 6 Drawing Sheets

(56) References Cited

U.S. PATENT DOCUMENTS

| | | | |
|---|---|---|---|
| 2011/0176778 A1* | 7/2011 | Little et al. | 385/76 |
| 2011/0195605 A1* | 8/2011 | Zhang et al. | 439/638 |
| 2011/0311188 A1* | 12/2011 | Wang et al. | 385/94 |

FOREIGN PATENT DOCUMENTS

| | | |
|---|---|---|
| JP | 2005-338782 | 12/2005 |
| KR | 10-2000-0006453 | 1/2000 |
| TW | M413130 | 10/2011 |
| WO | WO-2011/134544 | 3/2011 |

OTHER PUBLICATIONS

Office Action and Search Report with English Translation from corresponding Chinese Patent Application No. 201180045813.7, mailed Jun. 24, 2014, 20 pages.

U.S. Appl. No. 12/887,325, filed Jul. 21, 2010; Inventor Jamyuen Ko; entitled: Connector Optical Lens with Alignment Features.

International Search Report and Written Opinion mailed Apr. 9, 2012 for Int'l Application No. PCT/US2011/053287.

Final Office Action mailed Mar. 18, 2013 for U.S. Appl. No. 12/890,443, 15 pages.

Non-Final Office Action mailed Nov. 20, 2012 for U.S. Appl. No. 12/890,443, 12 pages.

International Preliminary Report on Patentability issued for International Patent Application No. PCT/US2011/053287, mailed Apr. 4, 2013.

Notice of Allowance issued for U.S. Appl. No. 12/890,443, mailed Jun. 21, 2013.

Office Action issued for Taiwanese Patent Application No. 100133478, mailed Aug. 23, 2013.

English Translation of Second Office Action from corresponding Chinese Patent Application No. 201180045813.7, dated Mar. 9, 2015, 8 pages.

\* cited by examiner

APPARATUS, METHOD, AND SYSTEM FOR IMPROVING BANDWIDTH OF A PLUG AND A CORRESPONDING RECEPTACLE

CLAIM OF PRIORITY

The present application is a Continuation of, and claims priority to and incorporates by reference, the corresponding U.S. patent application Ser. No. 12/890,443 filed Sep. 24, 2010, and entitled "AN APPARATUS, METHOD, AND SYSTEM FOR IMPROVING BANDWIDTH OF A PLUG AND A CORRESPONDING RECEPTACLE," and issued as U.S. Pat. No. 8,571,413 on Oct. 29, 2013.

FIELD OF THE INVENTION

Embodiments of the invention relate generally to the field of optics. More particularly, embodiments of the invention relate to an apparatus, method, and system for improving bandwidth of a plug and a corresponding receptacle.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2010, Intel Corporation, All Rights Reserved.

BACKGROUND

Current computer platform architecture design encompasses many different interfaces to connect one device to another device. The interfaces provide I/O (input/output) for computing devices and peripherals, and may use a variety of protocols and standards to provide the I/O. The differing interfaces may also use different hardware structures to provide the interface. For example, current computer systems typically include multiple ports with corresponding connection interfaces, as implemented by physical connectors and plugs at the ends of the cables connecting the devices. Common connector types may include a Universal Serial Bus (USB) subsystem with a number of associated USB plug interfaces, DisplayPort, High Definition Multimedia Interface (HDMI), Firewire (as set forth in IEEE 1394), or other connector type.

USB2 and USB3 are common I/O interfaces used to send and receive data between computer systems. These interfaces are also implemented together as USB micro-B connectors as specified by the Universal Serial Bus 3.0 Specification, Revision 1.0 Nov. 12, 2008. However, the USB micro-B connector does not have the bandwidth capacity of other interfaces (e.g., optical interfaces).

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the invention relate to an apparatus, method, and system for improving bandwidth of a plug and a corresponding receptacle.

In one embodiment, the plug and the receptacle are a Universal Serial Bus (USB) 2 plug and receptacle which are physically modified to include an optical interface so that the plug and the receptacle are backward compatible with a USB2 input-output (I/O) interface while providing an additional interface for higher bandwidth via the optical interface. In another embodiment, the plug and the receptacle include USB2 and USB3 I/O interfaces, wherein the USB2 I/O interface is modified to include an optical interface so that the plug and the corresponding receptacle is backward compatible with USB2 and USB3 I/O interfaces while providing an additional optical interface for higher bandwidth.

In one embodiment, the plug and the receptacle are a USB micro-B plug and receptacle which includes a USB2 and a USB3 I/O interface in a single connector, wherein the USB micro-B connector plug and receptacle are modified to include an optical interface to provide an additional interface for higher bandwidth.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme, e. g., differential pair, single-ended, etc.

Figure 1A:
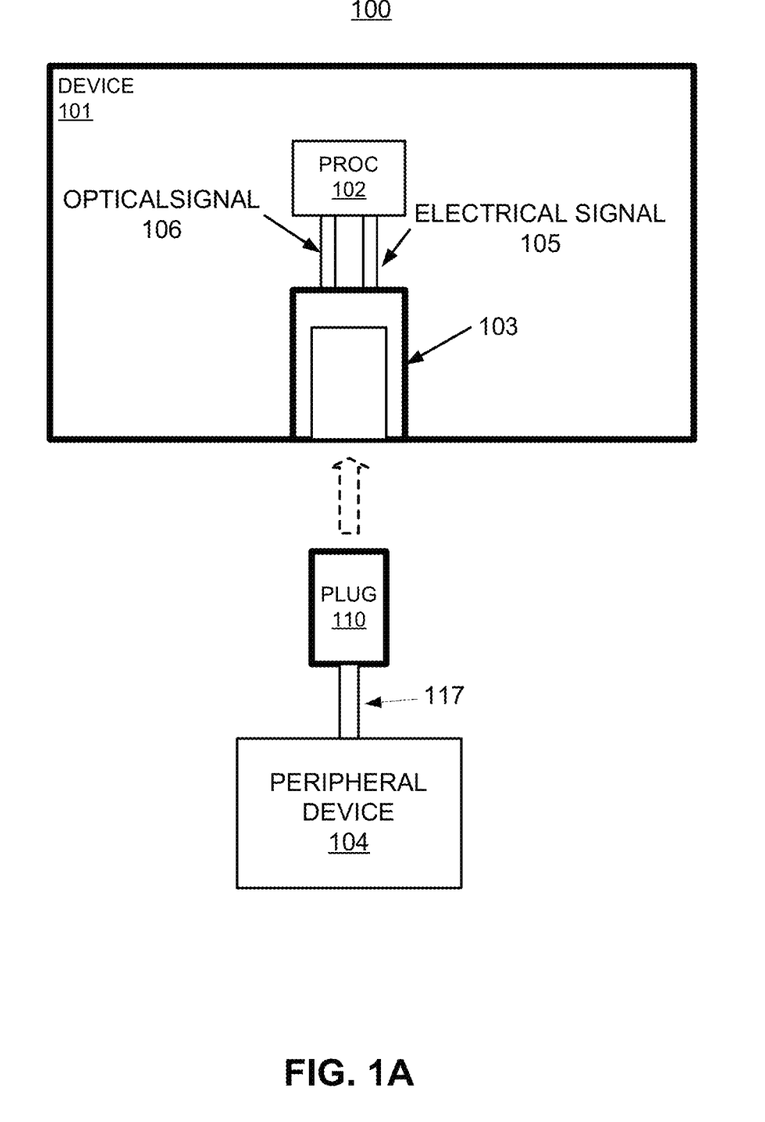
FIG. 1A illustrates a computer system having a plug and a receptacle with an optical link, according to one embodiment of the invention.

FIG. 1A illustrates a computer system 100 having a plug 110 and a corresponding receptacle 103 with an optical link, according to one embodiment of the invention. In one embodiment, the plug 110 and the receptacle 103 are a USB2 plug and receptacle which are physically modified to include an optical interface so that the plug 110 and the receptacle 103 are backward compatible with a USB2 I/O interface while providing an additional interface for higher bandwidth via the optical interface. In another embodiment, the plug 110 and the receptacle 103 include USB2 and USB3 I/O interfaces, wherein the USB2 I/O interface is modified to include an optical interface so that the plug 110 and the corresponding receptacle 103 is backward compatible with USB2 and USB3 I/O interfaces while providing an additional optical interface for higher bandwidth.

In one embodiment, the plug 110 and the corresponding receptacle 103 are a USB micro-B plug and receptacle which includes a USB2 and a USB3 I/O interface in a single connector, wherein the USB micro-B connector plug and receptacle are modified to include an optical interface to provide an additional interface for higher bandwidth.

In one embodiment, the plug 110 is operable to communicatively couple a peripheral device 104 to a device 101 via the receptacle 103. In one embodiment, the peripheral device 104 is any computing device such as a flash drive, an MP3 player, etc.

In one embodiment, the peripheral device 104 is coupled to the plug 110 via a hybrid cable 117 that is configured to carry electrical and optical transmission lines. In one embodiment, the electrical transmission lines include wires that meet the specification requirements of the USB2 and/or USB3 I/O interfaces. In one embodiment, the optical transmission lines include optic fibers for sending and receiving high bandwidth data between the peripheral device 104 and the device 101. The term "high bandwidth data" refers to data transfer rates above 2 GHz/Mb.

In one embodiment, the device 101 is operable to receive the plug 110 via the receptacle 103. In one embodiment, the device 101 includes a processor 102 which is operable to process electrical signals 105 and optical signals 106 received by the receptacle 103. In one embodiment, the processor 102 is an Atom® processor by Intel Corp. In other embodiments, other processors may be used without changing the essence of the embodiments of the invention.

Figure 1B:
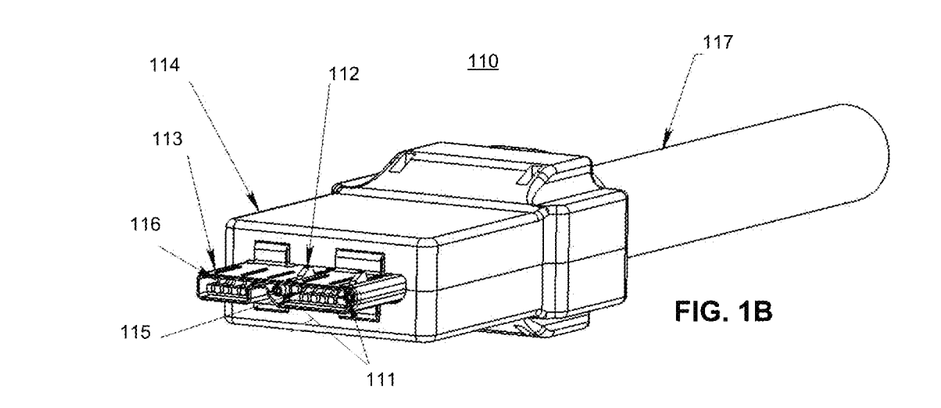
FIG. 1B illustrates a front view of the plug, according to one embodiment of the invention.

FIG. 1B illustrates a front view of the plug 110, according to one embodiment of the invention. In one embodiment, the plug 110 comprises a pair of lens units 111, wherein each lens unit of the pair 111 is positioned on either side of an I/O bus interface 115. In one embodiment, the I/O interface 115 is a USB2 I/O interface and the lens units are positioned so that the I/O interface 115 remains compatible with USB2 I/O interface specifications while providing an additional optical interface for high bandwidth data transfers. In one embodiment, the I/O interface is a USB2 I/O interface of the USB micro-B plug interface. In one embodiment, each lens unit of the pair 111 includes a lens to receive and/or transmit optical signals. The structure of the lens unit is discussed later with reference to 130 of FIG. 1C.

Referring back to FIG. 1B, in one embodiment each lens unit of the pair 111 along with the I/O interface 115 is housed by a shield 113 which is configured to protect the lens units of the pair 111 and to also guide the plug 110 to engage with the corresponding receptacle 103. In one embodiment, the shield 113 also houses an additional I/O interface 116. In one embodiment, the additional I/O interface 116 is a USB3 I/O interface. In one embodiment, the shield 113 houses the USB micro-B connector interface along with the lens units of the pair of lens units 111. In one embodiment, the shield 113 is composed of stainless steel.

In one embodiment, the shield 113 is configured to have one or more holes to provide space for a locking mechanism 112 which is configured to lock the plug 110 to the corresponding receptacle 103. In one embodiment, the locking mechanism 112 comprises one or more keys which are operable to be pressed for locking or unlocking the plug 110 with the corresponding receptacle 103.

In one embodiment, the plug 110 further comprises a cable housing 117 which houses electrical and optical transmission lines coupled to the I/O interfaces 115 and 116. In one embodiment, the cable housing 117 couples a plug body 114 of the plug 110 to a processor 102 of FIG. 1A. In one embodiment, the plug body 114 is configured to provide a grip to engage and disengage the I/O interfaces 115 and 116 with the corresponding receptacle 103. In one embodiment, the locking mechanism 112 prevents the shield 113 from moving backwards towards the cable housing 117.

Figure 1C:
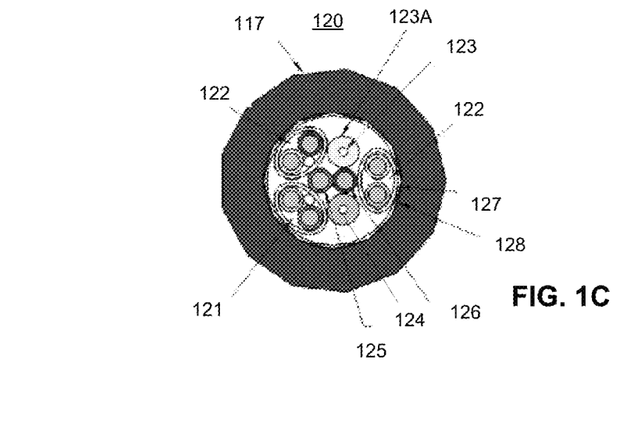
FIG. 1C illustrates a cross-section of a hybrid cable of the plug, according to one embodiment of the invention.

FIG. 1C illustrates a cross-sectional view 120 of the cable housing 117, according to one embodiment of the invention. In one embodiment, the cable housing 117 is composed of a flexible material that provides protection to the electrical and optical transmission lines in the cable housing 117 and to also allow the cable housing 117 to bend without affecting the transmission of the signals in the cable housing 117. In one embodiment, the cable housing 117 includes a braid 127 and a kevlar 128 in the inner circle of the cable housing 117 which immediately surrounds the cables in the cable housing 117. In one embodiment, the braid 127 is configured to shield and/or attenuate electromagnetic interference (EMI). In one embodiment, the kevlar 128 is configured to absorb stress on the cable housing 117 caused by pulling and/or stretching motions on the cable housing 117.

In one embodiment, the cable housing 117 includes unshielded twisted pair (UTP) electrical cables 122, shielded differential pair (SDP) electrical cables 121, power cable 125, ground cable 126, and a pair of fiber optic cables 123 and 124 that are coupled to each lens unit of the pair of the lens units 111 respectively. In one embodiment, the fiber optic cables 123 and 124 are covered by an insulating material 123A to protect the fiber optic cables 123 and 124 from cracking or other damages from external means.

Figure 1D:
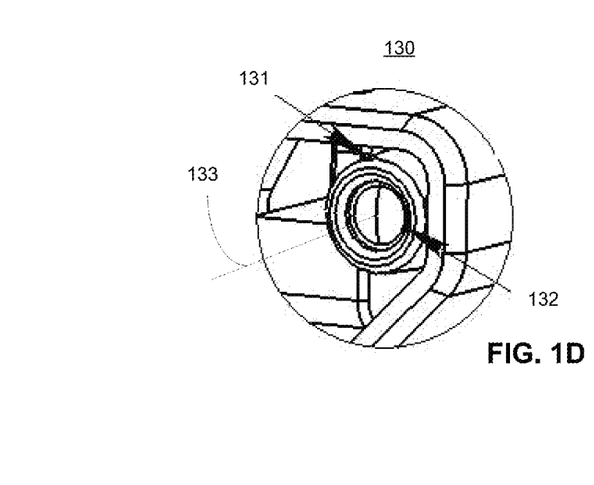
FIG. 1D illustrates a zoomed version of the plug with a lens to send or receive optical signals, according to one embodiment of the invention

FIG. 1D illustrates a zoomed version 130 of a lens 132 of one of the lens units 111, according to one embodiment of the invention. In one embodiment, the lens 132 is placed in position along an optical axis 133 by a tapered outer covering or housing 131. In one embodiment, the taper housing 131 has a taper surface which is configured to be inclined towards the lens 132 with a negative slope as the taper housing 131 meets the lens 132 so that the lens 132 is operable to be aligned with a corresponding lens 426 or 427 of the receptacle 103 which is discussed in FIG. 5C.

Referring back to FIG. 1D, in one embodiment the taper housing 131 has a taper surface which is configured to have a positive slope as the taper end meets the lens 132 so that the lens 132 is operable to be aligned with the corresponding lens 426 or 427 of the receptacle 103. In one embodiment, the slope of the taper housing 131 is opposite (i.e., different) from a slope of a corresponding taper housing of the corresponding lens 426 or 427 of the receptacle 103. The term "opposite" herein refers to the angle of the slope in that a positive slope (rising slope) is of opposite (i.e., different) angle to a negative slope (falling slope).

In one embodiment, the lens 132 is a convex lens made from two plano-convex lenses. In one embodiment, the material of the lens 132 is composed of Ultem. In other embodiments, other suitable material may be used to compose the lens 132. In one embodiment, the diameter of the lens 132 is 0.8 mm. In one embodiment, the lens has a clear aperture of 0.65 mm.

In one embodiment the lens 132 is operable to move laterally along its position. In one embodiment, the lens 132 is operable to move laterally by +/−200 μm along its position. In one embodiment, the lens 132 is operable to move vertically along its position. In one embodiment, the lens 132 is operable to move vertically by +/−100 μm along its position. The vertical and lateral movements of the lens 132 along its position allow the lens 132 to align its optical axis 133 with respect to an optical axis of the corresponding lenses 426 or 427 of the receptacle 103.

In one embodiment, the lens 132 is operable to move backwards along with its taper housing 131 by 1 mm. The backward movement of the lens 132 is in the direction toward the cable housing 117. In one embodiment, the lens 132 is operable to move backwards towards the cable housing 117 to allow the lens 132 to align with the corresponding lenses 426 or 427 of the receptacle 103 by engaging its taper housing 131 with a corresponding taper housing of the receptacle 103. In one embodiment, each lens unit of the pair 111 comprising the lens 132 is held in position within the taper housing 131 by a set of springs which are discussed later with reference to FIG. 3. In one embodiment, each lens unit of the pair of lens units 111 includes a hole (not shown) at the back of the lens unit to position the fiber optic cables 123 and 124 to the corresponding lens unit of the pair of lens units 111.

Figures 2, 3:
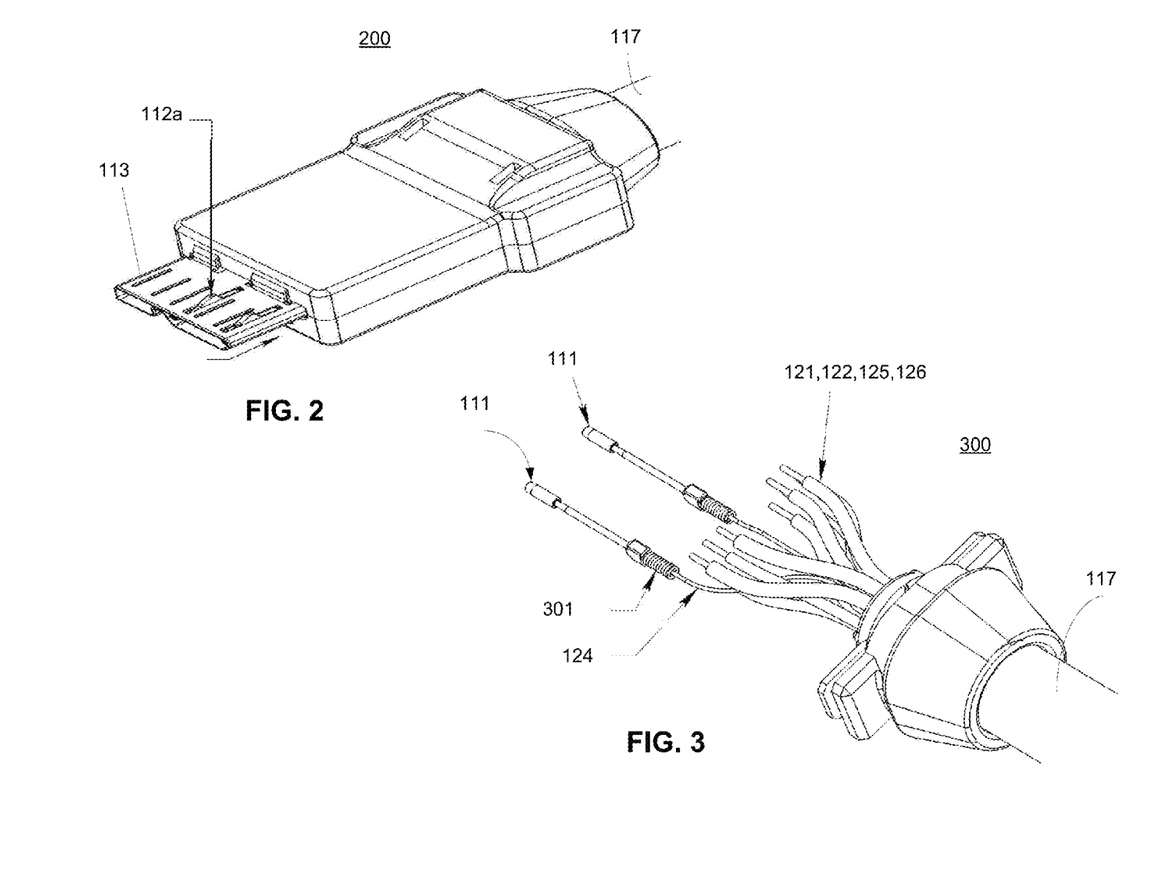
FIG. 2 illustrates a top view of the plug with a key, according to one embodiment of the invention.
FIG. 3 illustrates the hybrid cable with electrical and optical transmission lines, according to one embodiment of the invention.

FIG. 2 illustrates a top view 200 of the plug 110 with a locking mechanism, according to one embodiment of the invention. As discussed above with reference to FIG. 1B, in one embodiment the locking mechanism 112 comprises one or more keys 112a. The one or more keys 112a allow the plug 110 to engage or to disengage with the receptacle 103. In one embodiment, the keys 112a are pressable keys with springs.

The term "engage" herein refers to physically and electrically connecting the plug 110 with the corresponding receptacle 103. The term "disengage" herein refers to physically and electrically disconnecting the plug 110 from the corresponding receptacle 103.

In one embodiment, to engage the plug 110 with the receptacle 103, the keys 112a are pressed down to allow the plug 110 to connect with the receptacle 103 and then the keys 112a are released to lock the plug 110 with the receptacle 103. In one embodiment, to disengage the plug 110, the keys 112a are pressed down to allow the plug 110 to move freely away from the receptacle 103 and then the keys 112a are released to keep the shield 113 from moving towards the cable housing 117.

In one embodiment, when the plug 110 is disengaged from the receptacle 103, the keys 112a prevent the shield 113 from moving backwards towards the cable housing 117. In one embodiment, the keys 112a are operable to be pressed to unlock the shield 113 from the receptacle 103 and to allow the shield 113 to move freely along a predetermined distance in the direction of the cable housing 117. In one embodiment, the keys 112a are operable to be released to lock the shield 113 with the receptacle 103 and to prevent the shield 113 from moving freely along the predetermined distance.

In one embodiment, when the plug 110 is engaged with the receptacle 103, the keys 112a hold the plug 110 electrically and optically connected with the electrical and optical interface of the receptacle 103.

FIG. 3 illustrates a view 300 of the hybrid cables inside the cable housing 117, according to one embodiment of the invention. In one embodiment, the hybrid cables comprise electrical and optical transmission lines discussed above with reference to FIG. 1C. The term "hybrid cables" herein refers to cables comprising of electrical cables 121, 122, 125, and 126, and fiber optic cables 123 and 124. In one embodiment, each lens unit of the pair of lens units 111 is held and maintained in position on either side of the I/O interface 115 by a pair of springs 301. In one embodiment, the pair of springs 301 provides the necessary tension to each lens unit of the pair of lens units 111 so that the lenses of the lens units 111 remain aligned across their optical axes 133 even when the plug 110 is tampered with.

Figure 4:
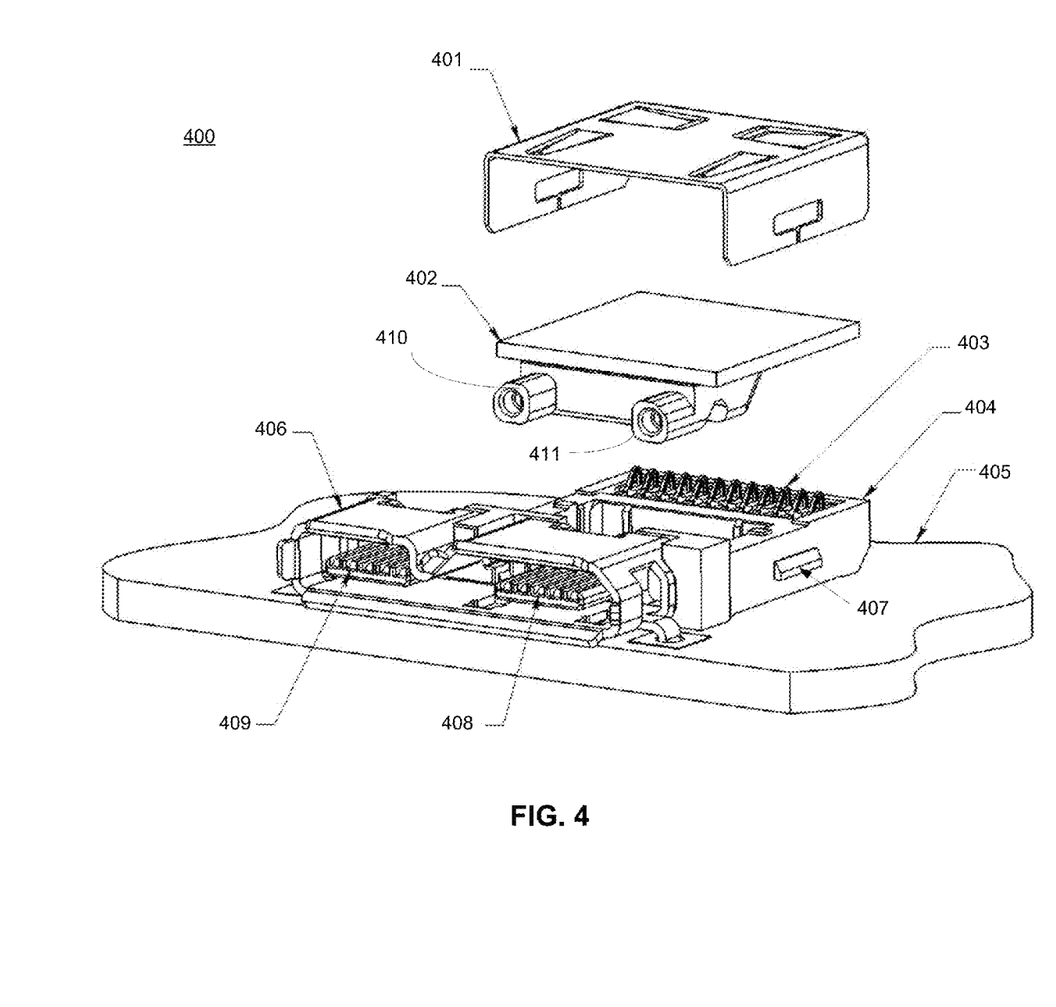
FIG. 4 illustrates components of a receptacle to receive the plug, according to one embodiment of the invention.

FIG. 4 illustrates the components 400 of the receptacle 103 to receive the plug 110, according to one embodiment of the invention. In one embodiment, the receptacle 103 includes a receptacle housing 404 to house an optical transceiver 402 and transceiver contacts 403. In one embodiment, the transceiver contacts 403 are electrical contacts that couple to electrical contacts (412 of FIG. 5A) on the optical transceiver 402. In one embodiment, the optical transceiver 402 includes a pair of lens units 410 and 411 that are configured so that each lens unit (410 and 411) of the pair resides on either side of an I/O interface 408. In one embodiment, each lens unit (410 and 411) of the pair is separated by a distance which is equal to the distance of separation between the corresponding lens units of the pair 111 of the plug 110.

Figure 5A:
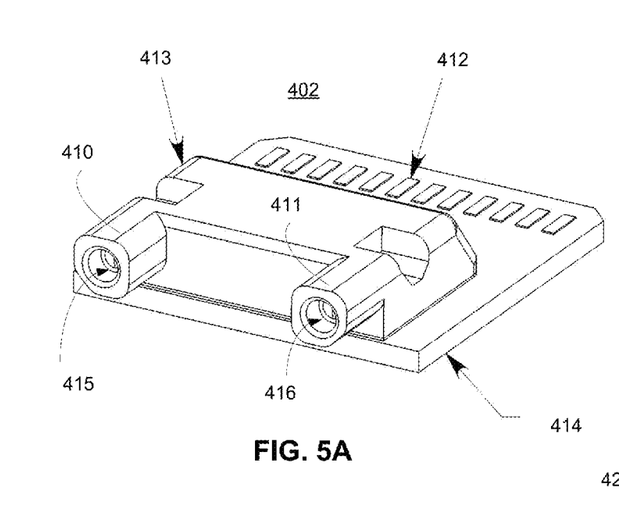
FIG. 5A illustrates an optical transceiver of the receptacle, according to one embodiment of the invention.

FIG. 5A illustrates a zoomed version of the optical transceiver 402 of the receptacle 103, according to one embodiment of the invention. The zoomed version of FIG. 5A is a bottom up view of the optical transceiver 402 of FIG. 4, according to one embodiment of the invention. In one embodiment, the optical transceiver 402 includes a lens body 413 having the pair of lens units (410 and 411) with lenses 415 and 416. Each lens unit (410 and 411) of the pair is either operable to transmit an optical signal or to receive an optical signal.

In one embodiment, the optical signal received or transmitted by the pair of lens units (410 and 411) is guided to photo-diodes and/or laser diodes via a light reflection mechanism (shown in FIG. 5B) inside the lens body. In one embodiment, each lens unit has a corresponding light reflection mechanism.

Figure 5B:
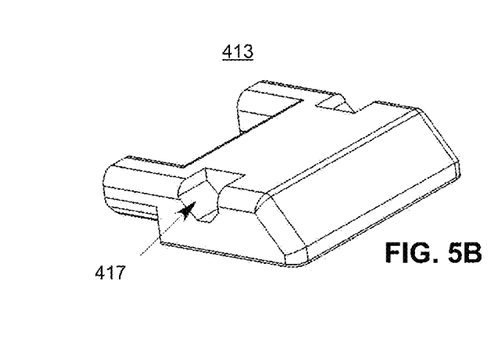
FIG. 5B illustrates a view of a lens body of the optical transceiver with an outside view of a reflection mechanism, according to one embodiment of the invention.

FIG. 5B illustrates a view of the lens body 413 of the optical transceiver 402 with an outside view of a reflection mechanism, according to one embodiment of the invention. FIG. 5B is discussed with reference to FIG. 1 and FIG. 5A. The reflection mechanism shown in FIG. 5B represents the outer surface 417 of the reflection mechanism. The inner surface (not shown) that receives an optical signal has a reflective surface which is configured in the same way (i.e. same angle) as the outer surface 417 of the reflection mechanism. In one embodiment, the reflection mechanism reflects (via the inner surface) the optical signal by 90 degrees so that the optical signal is guided from the lens unit (410 or 411) to a photo-diode. In one embodiment, the light reflection mechanism reflects the optical signal by 90 degrees so that the optical signal is guided from the laser unit to the lens unit (410 or 411). In one embodiment, the light reflection mechanism comprises a reflecting surface positioned inside the lens body 413 at an angle of 45 degrees (along a 90 degree bend in the lens unit 413) to reflect optical signals by 90 degrees. In one embodiment, the lens body 413 is configured to reside on a substrate having electrical contacts 412.

Figure 5C:
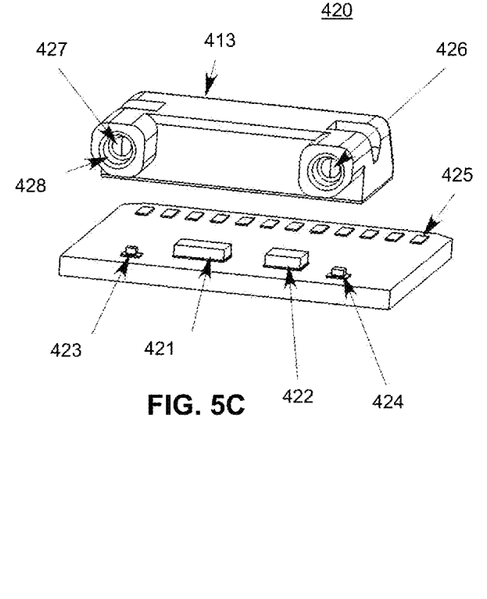
FIG. 5C illustrates components of the optical transceiver of the receptacle, according to one embodiment of the invention.

FIG. 5C illustrates components 420 of the optical transceiver 402 of the receptacle 103, according to one embodiment of the invention. In one embodiment, the lens 415 of the lens body 413 is operable to focus light to a photo-diode 423 that resides on the substrate 414. In one embodiment, the lens 415 of the lens body 413 is operable to collimate light from a laser diode 424 that resides on the substrate 414. In one embodiment, the contacts/pads 425 on the substrate 414 include electrical pads to provide power supply to the laser diode 424 and to the photo-diode 423. In one embodiment, the contacts/pads 425 also include electrical pads to send and receive electrical signals to the peripheral device 104 of FIG. 1 via the photo-diode 423 and the laser diode 424.

In one embodiment, the lenses 415 and 416 of the receptacle 103 are housed by a taper housing 428 which is similar to the taper housing 131 of the lens units 111 of the plug 110. In one embodiment, the taper housing 428 has a taper surface which is configured to have an opposite slope than the taper housing 131 of the plug 110 of FIG. 1D. In one embodiment, the taper surface of the taper housing 428 is configured to have a positive slope as the taper end of the taper housing 428 meets the lenses 415 and/or 416 so that the lenses 415 and/or 416 are operable to be aligned (along their respective optical axes) with the corresponding lenses (e.g., 132) of the plug 110.

In one embodiment, the lens units 111 of the plug 110 and the corresponding lens units 410/411 of the receptacle 103 are physically held and maintained in position during engagement of the plug 110 and the receptacle 103 via the taper housing 428 of the receptacle 103 and the taper housing 131 of the plug 110—the opposite slopes of the taper surfaces of the taper housings 131 and 428 lock the corresponding lenses of the plug 110 and the receptacle 103 with one another during engagement.

In one embodiment, the optical transceiver 402 includes one or more integrated circuits (ICs) 421 and 422 to process the optical signals from the photo-diode 423 and the laser diode 424. In one embodiment, the laser diode 424 is operable to convert electrical signals from the IC 422 to photons which are then transmitted to the corresponding lens 416 via the reflection mechanism (discussed with reference to FIG. 5B). In one embodiment, the photo-diode 423 is operable to convert photons to an electrical signal which is then transmitted to the IC 421 for processing. In one embodiment, the IC 422 includes an amplifier to drive the electrical signal via the laser diode 424 to the lens 416. In one embodiment, the ICs 421 and 422 are integrated on a single IC. In one embodiment, each lens unit of the pair of lens units 410 and 411 include a hole to couple the lenses 415 and 416 to an optical waveguide.

Referring back to FIG. 4, in one embodiment the receptacle 103 also includes a sheet cover or housing 401 to cover the receptacle housing 404 and to protect the components inside the receptacle housing 404 from any external hazard (external to the receptacle housing 404). In one embodiment, the sheet cover or housing 401 is configured to have one or more holes on the sides of the sheet cover or housing 401 which are operable to lock with the receptacle housing 404 via one or more keys 407 on either side of the receptacle housing 404. In one embodiment, the one or more keys 407 are pressable keys in that when the keys are pressed, the sheet cover or housing 401 can be removed from the receptacle housing 404. In one embodiment, the one or more keys 407 are pressed to align the sheet cover or housing 401 on the receptacle housing 404 and then the one or more keys 407 are released to lock the sheet cover or housing 401 to the receptacle housing 404.

In one embodiment, the receptacle 103 resides on a motherboard 405 or any other substrate. In one embodiment, the receptacle 103 includes a shield 406 that covers one or more I/O interfaces 408 and/or 409 that correspond to the I/O interfaces 115 and 116 of the plug 110 respectively. In one embodiment, the I/O interfaces 408 and 409 are USB2 and USB3 (receiving end) I/O interfaces respectively of a USB micro-B connector.

Figure 6:
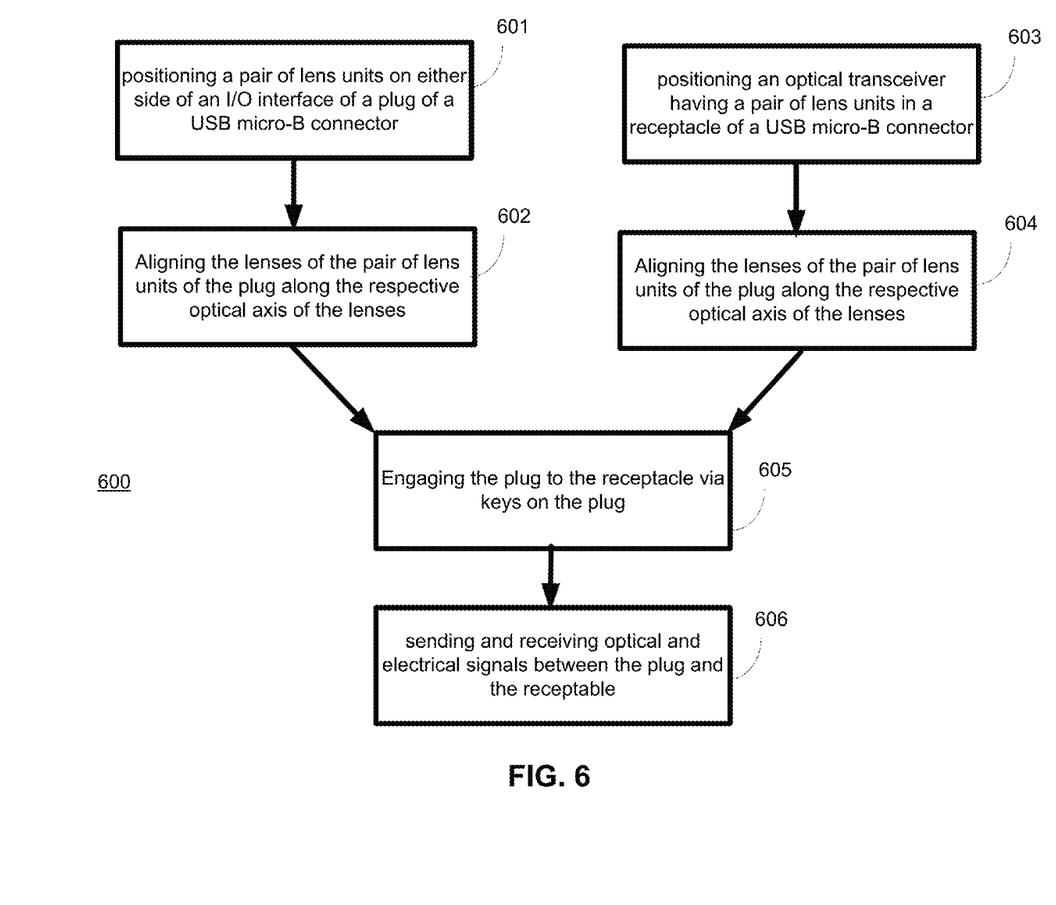
FIG. 6 is a high level flowchart of making the plug and the receptacle, according to one embodiment of the invention.

FIG. 6 illustrates a method flowchart 600, according to one embodiment of the invention. The flowchart 600 is described with reference to FIGS. 1-5. At block 601, a pair of lens units 111 is positioned on either sides of the USB2 I/O interface of the USB micro-B connector plug 110. At block 602, the lenses of the lens units 111 are aligned along their respective optical axes 133. At block 603, a pair of lens units 410 and 411 is positioned in an optical transceiver of the receptacles 103 of the USB micro-B connector. At block 604, the lenses of the lens units 410 and 411 are aligned along their respective optical axes. In one embodiment, the optical axes 133 of the lens units 111 is the same as the optical axes for the lens units 410/411.

At block 605, the plug 110 is engaged with the receptacle 103 via the one or more keys 112a of the plug 110. At block 606, optical and/or electrical signals are transmitted and received between the plug 110 and the receptacle 103.

Embodiments of the invention (e.g., the method FIG. 6) can also be implemented by executing computer executable instructions stored on a machine-readable storage medium. The machine-readable storage medium may include, but is not limited to, flash memory, optical disks, CD-ROMs, DVD ROMs, RAMs, EPROMs, EEPROMs, magnetic or optical cards, or any other type of machine-readable storage media suitable for storing electronic or computer-executable instructions. For example, embodiments of the invention may be downloaded as a computer program which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

We claim:

1. An apparatus comprising:
   a first pair of lens units, each lens unit of the pair positioned on either side of an input-output (I/O) bus interface, the pair of lens units to send and receive optical signals respectively;
   a first housing to shield the first pair of lens units and for physically coupling the I/O bus interface and the first pair of lens units to a receptacle; and a key to grasp the first housing and to lock the first housing with the receptacle, wherein each lens unit of the first pair of lens units comprises:
 a lens; and
 a first taper housing to house the lens and for locking the lens with a corresponding lens of the receptacle.

2. The apparatus of claim 1, wherein the I/O bus interface is a Universal Serial Bus 2 (USB2) I/O interface.

3. The apparatus of claim 2, wherein the USB2 interface resides physically next to a USB3 I/O interface.

4. The apparatus of claim 2, further comprising a second housing coupled to the first housing, the second housing to couple the USB2 and the USB3 I/O interfaces to a cable having an electrical transmission line and an optical waveguide.

5. The apparatus of claim 3, wherein the USB2 and the USB3 I/O interfaces have electrical contacts that are configured to be backward compatible with a USB micro-B connector.

6. The apparatus of claim 1, wherein each lens unit of the first pair of lens units further comprises:
 a spring to maintain a position of the lens relative to an optical axis of the lens; and
 a hole to couple the lens with an optical waveguide interface.

7. The apparatus of claim 1, wherein the key is operable to be pressed to unlock the first housing to allow it to move freely along a predetermined distance, and wherein the key is further operable to be released to lock the first housing with the receptacle and to prevent the first housing from moving freely along the predetermined distance.

8. The apparatus of claim 6, wherein the receptacle comprises:
 an I/O bus interface having electrical contacts;
 an optical transceiver to send and receive optical signals; and
 a third housing to maintain a position of the optical transceiver and the electrical contacts of the I/O bus interface.

9. The apparatus of claim 8, wherein the optical transceiver comprises:
 a second pair of lens units, each lens unit of the second pair of lens units separated from one another by a distance equal to a distance of separation between the lens units of the first pair of lens units;
 a photodiode coupled to one of the lens units of the second pair of the lens units, the photodiode to convert photons to an electrical signal; and
 a laser diode coupled to the other lens units of the second pair of the lens units, the laser diode to convert an electrical signal to photons.

10. The apparatus of claim 9, wherein each lens unit of the second pair of lens units comprises:
 a lens;
 a second taper housing to house the lens and for locking the lens with a corresponding lens of the first pair of lens units, wherein the second taper housing has a second taper angle which is different from a first taper angle of the first taper housing; and
 a hole to couple the lens to an optical waveguide interface.

11. The apparatus of claim 9, wherein the optical transceiver further comprises an integrated circuit to drive the laser diode and to convert the electrical signal from the photodiode to an electrical current or voltage.

12. The apparatus of claim 8, wherein the I/O bus interface of the receptacle is a Universal Serial Bus 2 (USB2) I/O interface.

13. The apparatus of claim 12, wherein the USB2 I/O interface of the receptacle resides physically next to a USB3 I/O interface of the receptacle.

14. The apparatus of claim 8, wherein the receptacle further comprises a fourth housing to cover the third housing and to lock in position with the third housing via a key of the third housing.

15. A system comprising:
 a receptacle; and
 a plug to couple to the receptacle, the plug comprising:
  a first pair of lens units, each lens unit of the pair positioned on either side of an input-output (I/O) bus interface, the pair of lens units to send and receive optical signals respectively;
  a first housing to shield the first pair of lens units and for physically coupling the I/O bus interface and the first pair of lens units to the receptacle; and
  a key to grasp the first housing and to lock the first housing with the receptacle,
  wherein each lens unit of the first pair of lens units comprises:
   a lens; and
   a first taper housing to house the lens and for locking the lens with a corresponding lens of the receptacle.

16. The system of claim 15, wherein the I/O bus interface is a Universal Serial Bus 2 (USB2) I/O interface which resides physically next to a USB3 I/O interface.

17. The system of claim 16, wherein the USB2 and the USB3 I/O interfaces include electrical contacts that are configured to be backward compatible with a USB micro-B connector.

18. The system of claim 15, wherein each lens unit of the first pair of lens units further comprises:
 a spring to maintain a position of the lens relative to an optical axis of the lens; and
 a hole to couple the lens with an optical waveguide interface.

19. The system of claim 15, wherein the receptacle comprises:
 an I/O bus interface having electrical contacts;
 an optical transceiver to send and receive optical signals; and
 a third housing to maintain a position of the optical transceiver and the electrical contacts of the I/O bus interface.

20. The system of claim 19, wherein the optical transceiver comprises:
 a second pair of lens units, each lens unit of the second pair of lens units separated from one another by a distance equal to a distance of separation between the lens units of the first pair of lens units;
 a photodiode coupled to one of the lens units of the second pair of the lens units, the photodiode to convert photons to an electrical signal; and
 a laser diode coupled to the other lens unit of the second pair of the lens units, the laser diode to convert an electrical signal to photons.

* * * * *